United States Patent [19]

Esswein et al.

[11] Patent Number: 4,953,962
[45] Date of Patent: Sep. 4, 1990

[54] MICROSCOPE OBJECTIVE FOR ACCOMMODATING DIFFERENT COVER-GLASS THICKNESSES

[75] Inventors: Karlheinz Esswein; Ludwig Kummer, both of Aalen, Fed. Rep. of Germany

[73] Assignee: Carl-Zeiss-Stiftung, Heidenheim/Brenz, Fed. Rep. of Germany

[21] Appl. No.: 331,683

[22] Filed: Mar. 30, 1989

[30] Foreign Application Priority Data

Apr. 16, 1988 [DE] Fed. Rep. of Germany ....... 3812745

[51] Int. Cl.$^5$ .................... G02B 21/02; G02B 11/30
[52] U.S. Cl. ..................................... 350/507; 350/414
[58] Field of Search ..................... 350/414, 518, 507

[56] References Cited

U.S. PATENT DOCUMENTS

| | | |
|---|---|---|
| 4,059,342 | 11/1977 | Tojyo . |
| 4,208,101 | 6/1980 | Trapp et al. ..................... 350/414 |
| 4,403,835 | 9/1983 | Ushida . |
| 4,666,256 | 5/1987 | Shimizu et al. . |
| 4,666,262 | 5/1987 | Zobel ................................. 350/518 |

FOREIGN PATENT DOCUMENTS

| | | |
|---|---|---|
| 1037719 | 2/1959 | Fed. Rep. of Germany . |
| 3113802 | 1/1982 | Fed. Rep. of Germany . |
| 660865 | 11/1951 | United Kingdom . |

Primary Examiner—Bruce Y. Arnold
Assistant Examiner—Rebecca D. Gass
Attorney, Agent, or Firm—Stonebraker, Shepard & Stephens

[57] ABSTRACT

A microscope objective adjustable for different thicknesses of cover-glass includes a second lens (L2 and L3) movable between a first lens (L1) and a third lens (L4) and a fourth lens (L5) movable with the second lens, but in an opposite direction. A ring that accomplishes movements of the second and fourth lenses also resets the focus of the objective. All movements are linear and are arranged to maintain the correction of image error while the objective is adjustable over a wide range of cover-glass thicknesses from 0 to 2 mm.

17 Claims, 5 Drawing Sheets

MICROSCOPE OBJECTIVE FOR ACCOMMODATING DIFFERENT COVER-GLASS THICKNESSES

BACKGROUND

This invention involves a microscope objective having a linear magnification of between 32× and 60×, an aperture of at least 0.5, and a device that can set the objective to accommodate different cover-glass thicknesses. For any given aperture, a microscope objective design must take into account different thicknesses of cover-glasses to be used, since presence of a cover-glass, or changes in the thickness of any cover-glass that is present, influences the spherical aberration of the objective.

Since even small differences in cover-glass thicknesses noticeably impair the microscopic image for higher aperture objectives, correction mounts have been used to set these objectives to accommodate different cover-glass thicknesses. Such correction mounts, as described, for example, in Austrian Patent No. 170000 (corresponding Great Britain Patent No. 660,865) and West German Publication No. 2602730 (corresponding U.S. Pat. No. 4,059,342), change the air separation between two lenses of the objective. Generally, the rear lens is moved for this, while the front lens remains stationary. This varies the spherical aberration of the objective and thus compensates for the influence of different thicknesses of cover-glass.

Objectives are also known with correction mounts that permit a setting adjustment over a relatively large range of cover-glass thicknesses of from 1 to 2 mm. Such objectives are used, for example, in cellular research where objects are placed on inverse microscopes and observed through the bottom of a culture vessel. Objectives for this purpose are described, for example, in West German Publication No. 3113802 and U.S. Pat. Nos. 4,403,835 and 4,666,256. These objectives, in the same way as the objective described in West German Patent No. 1037719, provide a lens that is movable between two stationary lenses. This causes two air separations to change simultaneously: change in one air separation corrects for the spherical aberration introduced by the cover-glass, and change in the other air separation counteracts an impairment in the field correction for astigmatism, brought about by the movement.

It is also known from West German Patent No. 1037719 to move the entire objective simultaneously with a cover-glass thickness correction movement, for the purpose of resetting the focus.

In the power range of interest (a linear magnification between 32× and 60× and an aperture between 0.5 and 0.7), these measures can correct only for slight differences of about 1 mm in cover-glass thicknesses. The objective 40/0.55 indicated in West German Publication No. 3113802, for correcting cover-glass thickness differences of 2 mm, suffers from image errors, particularly astigmatism, which cannot be tolerated for a plano objective for a flat image field. In contrast, our way of setting a microscope objective to accommodate different cover-glass thicknesses can maintain a high quality correction of the image errors while accommodating a wide range of cover-glass thicknesses.

SUMMARY OF THE INVENTION

Our cover-glass thickness adjusting device applies to a microscope objective having a linear magnification of between 32× and 60×, an aperture of at least 0.5, and including, in the order of light transmission, a stationary first lens, a movable second lens, and a stationary third lens. The cover-glass thickness adjusting device includes a fourth lens arranged beyond the third lens in the order of light transmission. The fourth lens is movable with the second lens, and movement of the fourth lens is in a direction opposite to movement of the second lens. The fourth lens is preferably a cemented component of negative refractive power spaced from the stationary third lens. Since a change in the air separation between the stationary third lens and the fourth lens affects the field correction of the objective, particularly for astigmatism, and leaves the spherical aberration substantially unchanged, these two portions of the aberration can be optimized independently of each other by moving the second and fourth lenses to achieve good correction over a wide range of changes in cover-glass thicknesses.

Corrective movement of the second and fourth lenses does not require any complicated courses of movement, and these lenses can be moved linearly for a setting adjustment for cover-glass thickness. The necessary movement can be achieved, for example, by threads of different pitch or by cams engaging followers of constant but different pitch in a turnable intermediate ring of the lens mount.

Since a stationary third lens is arranged between the two movable lenses, it can be used as a centering lens to compensate for manufacturing tolerances during assembly of the objective, so that the third lens is preferably included in a centering mount. This can then be used as a carrier for a phase ring in the Zernike contrast method. In this phase contrast process, it is important to keep the phase ring position fixed within the objective so that the imaging condition between the diaphragm and the condenser and the phase ring and the objective is substantially retained, even as cover-glass thicknesses change.

It is also advantageous for the resetting of the focus of the entire objective to be coupled with the setting adjustment for different cover-glass thicknesses, so that both changes can be effected by the same adjustment ring, to make the setting manipulation easy and convenient. Moreover, since the front lens of the objective does not move as setting adjustments are made for different cover-glass thicknesses, the stationary front lens of the objective can readily be sealed off.

DETAILED DESCRIPTION

Figure 1:
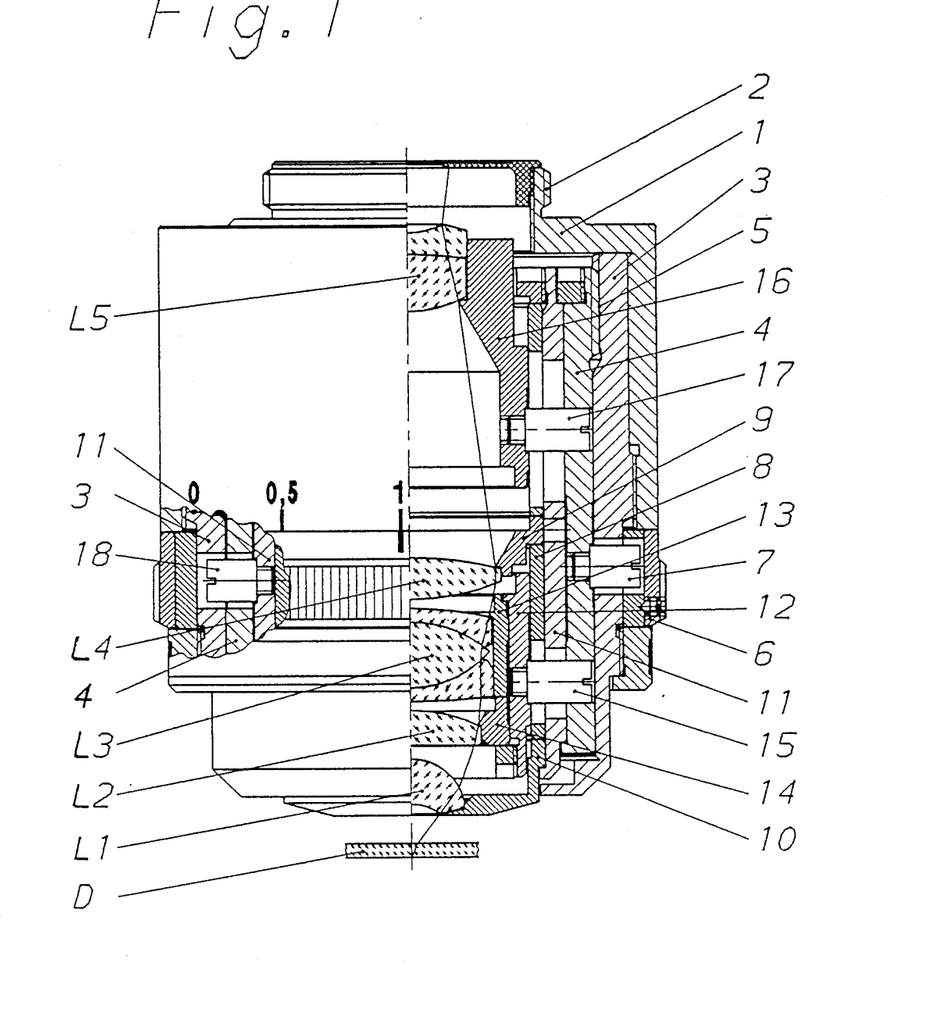
FIG. 1 is a partially cutaway, elevational view of a preferred embodiment of a microscope objective according to our invention.
Figure 2A:
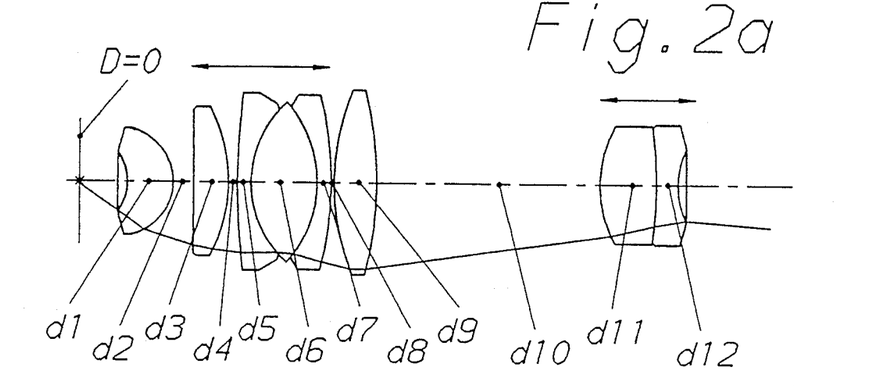
FIGS. 2a, 2b, and 2c schematically show preferred lenses for a microscope objective of FIG. 1, with the lenses adjusted in FIG. 2a for no cover-glass thickness, in FIG. 2b for a cover-glass thickness of 1 mm, and in FIG. 2c for a cover-glass thickness of 2 mm.
Figure 2B:
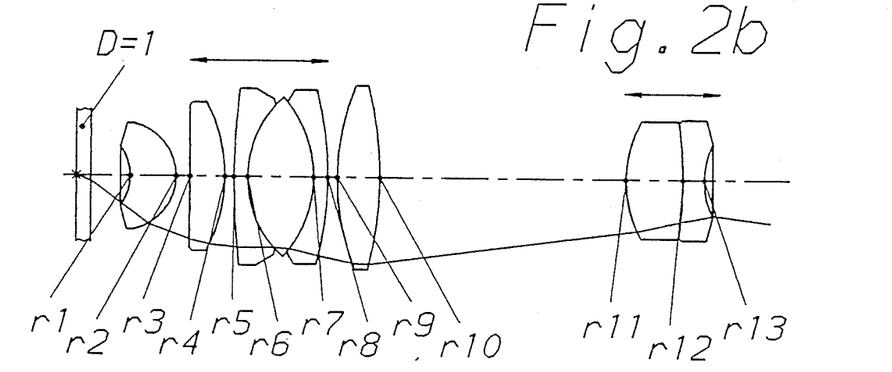
Figure 2C:
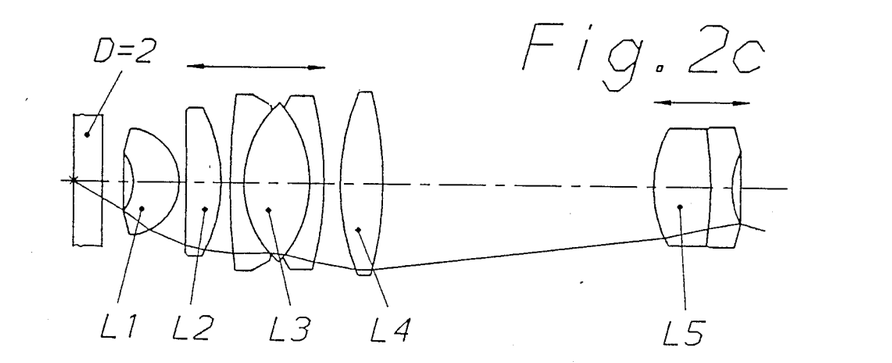

The objective shown in FIGS. 1 and 2 is a planachromatic objective having a linear magnification of 40× and an aperture of 0.6. Its stationary front lens (L1) is developed, as is customary for objectives of this power range, as a concave-convex converging lens. The front or first lens (L1) is followed by a concave-convex single lens (L2) and a cemented component or lens (L3) consisting of three lenses. These include a bi-convex condensing lens straddled by a convex-concave negative lens and a concave-convex negative lens. The lenses (L2 and L3) constitute a second lens movable along the optical axis, as explained below. Following the second lens component (L3), in the order of light transmission, is a stationary third lens formed as a bi-convex single lens (L4). This third lens (L4) is stationary in the same way as the first lens (L1).

The image side closure of the objective is formed by a fourth lens (L5), which is also movable along the optical axis. The lens (L5) is a cemented component consisting of a bi-convex positive lens and a bi-concave negative lens. As a whole, it has a negative focal length and serves for the field correction of the objective. In particular, it eliminates the astigmatism that occurs when the second lens (L2 and L3) is moved axially.

The mount of the objective shown in FIG. 1 has an outer ring 1 attachable to the microscope housing by means of screw thread 2. Another stationary ring 3 is threaded into outer ring 1, and ring 3 has an internal thread 5 for threadably receiving an intermediate ring 4, which is provided with a cam 7 engaging a recess of an actuating ring 6 rotatable around ring 3. Actuating ring 6, intermediate ring 4, and cam 7 are components of the adjusting device which is used for moving the second and fourth lenses to compensate for the thickness of the cover-glass covering the object being observed. Actuating ring 6 is rotatable around the outside of the objective to a predetermined position selected in accordance with the thickness of the cover-glass, and when ring 6 turns, cam 7 and intermediate ring 4 also turn with it.

The turnable intermediate ring 4 has two spiral grooves with opposite pitch of different steepness. These grooves serve as cams respectively engaging cam follower 17, which is connected to mount 16 for fourth lens (L5), and cam follower 15, which is attached to movable mount 12 for the detachable mounts 13 and 14 respectively holding lenses L3 and L2. Cam followers 17 and 15 also extend through axial slots in mount ring 8 and carrier sleeve 11, which receives the mount 10 for first lens (L1) and also receives all the other lens mounts 9, 12, and 16. Carrier sleeve 11 is secured against rotation by means of a pin 18 attached to sleeve 11 and engaged in a recess in stationary ring 3. This assures that the axially movable lenses do not rotate with actuating ring 6.

When ring 6 is turned for adjustment to different cover-glass thicknesses, the movable lenses (second lens L2/L3 and fourth lens L5) move in opposite directions along the optical axis, because of the cam grooves in rotatable intermediate ring 4 engaged by followers 15 and 17. The stroke of fourth lens (L5) i.e., the distance through which lens L5 is adjustable, is about three times as great as the stroke of second lens (L2/L3). At the same time, carrier sleeve 11 moves all the lenses of the objective along the optical axis, to reset the focus. This is caused by the threads 5 connecting rotatable ring 4 with fixed ring 3.

The movements involved are illustrated in FIGS. 2a, 2b, and 2c, where the relationships for a setting to cover-glass thickness 0 (FIG. 2a) to a medium cover-glass thickness of D=1 mm (FIG. 2b) and to a cover-glass thickness of D=2 mm (FIG. 2c) are shown. In addition to the working distance of the objective, three air separations d2, d8, and d10 are changed by the movements of the second and fourth lenses. Specifically, by varying these parameters, a constantly good image error correction can be obtained over the entire range of variation of cover-glass thickness of from 0 to 2 mm.

Preferred parameters for an objective with a linear magnification of 40× and an aperture of 0.6, as shown in FIGS. 1 and 2, are set out in Table I. There, d is the thicknesses of the lenses and the air separations, r is the radius of curvature of the lens surfaces, numbered consecutively as shown in FIGS. 2a and 2b, nd designates the indices of refraction, and γd is the Abbe numbers of the glass.

TABLE I

| Lens | Radius r/mm | Thickness d/mm | Distance d/mm | Index of Refraction nd | Abbe Number γ d |
|---|---|---|---|---|---|
| L1 | r1 = −3.566 | d1 = 3.24 | | 1.5205 | 69.7 |
| | r2 = −3.839 | | d2 = 1.43 to 0.48 | | |
| L2 | r3 = −659.4 | d3 = 2.50 | | 1.5891 | 61.3 |
| | r4 = −10.96 | | d4 = 0.62 | | |
| | r5 = 48.448 | d5 = 1.0 | | 1.6134 | 44.3 |
| L3 | r6 = 7.515 | d6 = 4.7 | | 1.4866 | 84.5 |
| | r7 = −8.485 | d7 = 1.0 | | 1.8807 | 41.0 |
| | r8 = −24.36 | | d8 = 0.20 to 1.15 | | |
| L4 | r9 = 17.013 | d9 = 3.0 | | 1.5285 | 77.0 |
| | r10 = −25.925 | | d10 = 15.75 to 19.06 | | |
| | r11 = 8.593 | d11 = 4.0 | | 1.4585 | 67.7 |
| L5 | r12 = −29.03 | d12 = 1.5 | | 1.6967 | 56.4 |

TABLE I-continued

| Lens | Radius r/mm | Thickness d/mm | Distance d/mm | Index of Refraction nd | Abbe Number γ d |
|---|---|---|---|---|---|
| | r13 = 5.975 | | | | |

Cover-glass: 0 to 2 mm
Working distance: W = 3.3 mm to 2.2 mm
Linear magnification: β = 40 x
Numerical aperture: A = 0.6

Figure 3A:
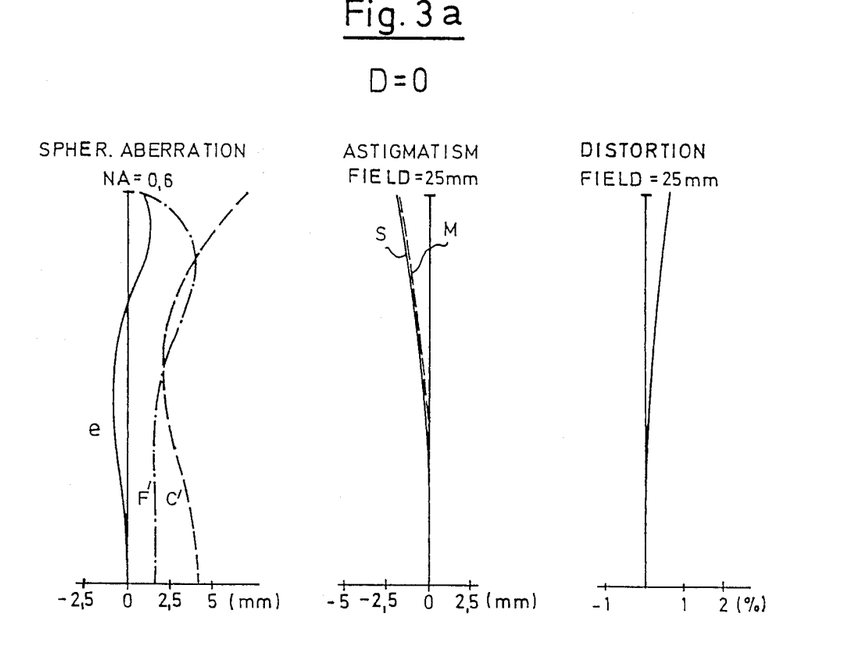
FIGS. 3a, 3b, and 3c show the correction curves for the image errors of the objective of FIG. 1, for the respective cover-glass thicknesses of 2a, 2b, and 2c.
Figure 3B:
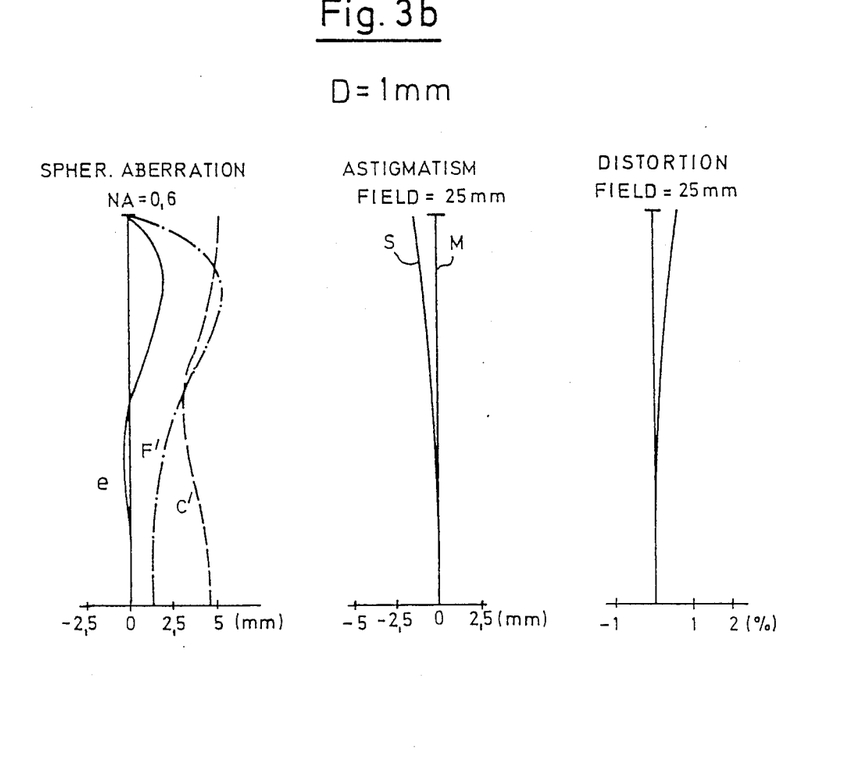
Figure 3C:
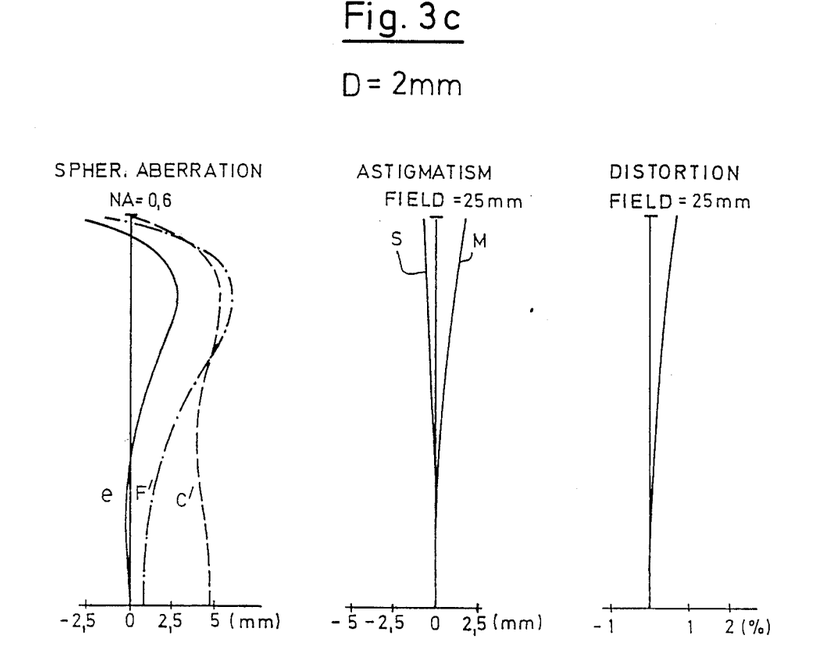

FIGS. 3a, 3b, and 3c show the image errors of this objective for spherical aberration, astigmatism, and distortion for three cover-glass thicknesses of D=0, D=1 mm, and D=2 mm. The spherical aberration and astigmatism are indicated in millimeters, and the distortion is indicated in percent. Astigmatism and distortion are shown over the entire image field diameter of 25 mm.

As is apparent from FIGS. 3a to 3c, the objective has excellently corrected values for all three cover-glass thicknesses, and the correction values lie well below the limit of visibility over the entire image field. The objective can therefore be correctly called a planochromatic objective.

The accurate correction properties of the objective over the entire range of cover-glass thicknesses does not require any undue expense in manufacturing, because all movements within the mount occur linearly. No complicated curved bodies have to be manufactured and adjusted, since the pitch of cam slots and threads in rotatable ring 4 are all linear.

Parameters for another preferred objective according to our invention, having a linear magnification of 32× and an aperture of 0.55, are shown in Table II.

TABLE II

| Lens | Radius r/mm | Thickness d/mm | Distance d/mm | Index of Refraction nd | Abbe Number γ d |
|---|---|---|---|---|---|
| L1 | r1 = −2.751 | d1 = 2.05 | | 1.5205 | 69.7 |
| | r2 = −3.110 | | d2 = 1.44 to 0.21 | | |
| L2 | r3 = −132.1 | d3 = 2.15 | | 1.4866 | 84.5 |
| | r4 = −7.032 | | d4 = 3.38 | | |
| | r5 = 34.383 | d5 = 2.0 | | 1.5986 | 46.9 |
| | r6 = 9.040 | | | | |
| L3 | | d6 = 5.0 | | 1.4866 | 84.5 |
| | r7 = −7.766 | d7 = 1.0 | | 1.8807 | 41.0 |
| | r8 = −17.974 | | d8 = 3.73 to 4.96 | | |
| L4 | r9 = 15.281 | d9 = 3.0 | | 1.4866 | 84.5 |
| | r10 = −163.8 | | d10 = 10.48 to 16.07 | | |
| | r11 = 5.862 | d11 = 3.9 | | 1.4875 | 70.4 |
| L5 | r12 = −21.964 | d12 = 1.0 | | 1.6228 | 56.9 |
| | r13 = 4.278 | | | | |

Cover-glass: 0 to 2 mm
Working distance: W = 2.4 mm to 1.55 mm
Linear magnification: β = 32 x
Numerical aperture: A = 0.55

Parameters for another preferred objective according to our invention, having a linear magnification of 50× and an aperture of 0.65, are shown in Table III.

TABLE III

| Lens | Radius r/mm | Thickness d/mm | Distance d/mm | Index of Refraction nd | Abbe Number γ d |
|---|---|---|---|---|---|
| L1 | r1 = −3.563 | d1 = 2.21 | | 1.5205 | 69.7 |
| | r2 = −3.091 | | d2 = 1.40 to 0.11 | | |
| L2 | r3 = −354.6 | d3 = 2.22 | | 1.4866 | 84.5 |
| | r4 = −8.262 | | d4 = 0.9 | | |
| | r5 = 39.776 | d5 = 0.9 | | 1.6134 | 44.3 |
| | r6 = 8.778 | | | | |
| L3 | | d6 = 4.63 | | 1.4866 | 84.5 |
| | r7 = −6.945 | | | | |

TABLE III-continued

| Lens | Radius r/mm | Thickness d/mm | Distance d/mm | Index of Refraction nd | Abbe Number γd |
|---|---|---|---|---|---|
| | | d7 = 1.02 | | 1.8807 | 41.0 |
| | r8 = −17.314 | | | | |
| | | | d8 = 0.19 to 1.48 | | |
| | r9 = 13.598 | | | | |
| L4 | | d9 = 3.4 | | 1.4866 | 84.5 |
| | r10 = −54.136 | | | | |
| | | | d10 = 13.85 to 20.30 | | |
| | r11 = 5.143 | | | | |
| | | d11 = 3.87 | | 1.4585 | 67.7 |
| L5 | r12 = −10.086 | | | | |
| | | d12 = 1.24 | | 1.6511 | 55.6 |
| | r13 = 3.927 | | | | |

Cover-glass: 0 to 2 mm
Working distance: W = 2.35 mm to 1.3 mm
Linear magnification: β = 50 x
Numerical aperture: A = 0.65

The objectives of Tables II and III are also planachromatic objectives having image error correction comparable to that of the objective of Table I, whose correction curves are illustrated in FIGS. 3a to 3c. The objectives of Tables II and III are also constructed in a similar way, such as illustrated in FIGS. 1 and 2, consisting of eight lenses arranged in four lens groups; the second lens, consisting of lenses L2 and L3; and the fourth lens, consisting of cemented component L5, being movable oppositely to each other. The lens arrangements for the objectives of Tables II and III correspond essentially to the lens arrangement illustrated in FIGS. 2a–2c.

We claim:

1. In a microscope for observing objects covered by cover-glasses of differing thicknesses, an objective having a linear magnification of between 32× and 60×, an aperture of at least 0.5, and an optical axis along which are aligned, in the order of light transmission, a stationary first lens (L1), a movable second lens (L2/L3), and a stationary third lens (L4), said microscope objective comprising:
   a. a movable fourth lens (L5) arranged beyond said third lens in said order of light transmission; and
   b. an adjusting device, selectively positionable in accordance with the thickness of the cover-glass covering an object being observed, for moving said second and fourth lenses to adjust the objective to compensate for said cover-glass thickness, the movement of said fourth lens being in a direction opposite to movement of said second lens.

2. The microscope objective of claim 1 wherein the movements of said second and fourth lenses are linear.

3. The microscope objective of claim 1 wherein the stroke of movement of said fourth lens is larger than the stroke of movement of said second lens.

4. The microscope objective of claim 3 wherein said strokes of movement differ by at least a factor of three.

5. The microscope objective of claim 1 wherein said third lens is held in a centering mount.

6. The microscope objective of claim 1 wherein all of said lenses are mounted within a carrier (11) which is itself movable along said optical axis for focusing the objective, and wherein the selective positioning of said adjusting device also moves said carrier for resetting the focus of said microscope objective.

7. The microscope objective of claim 6 wherein said adjusting device includes a single actuating ring arranged for causing said opposing movement of said second and fourth lenses and for moving said carrier.

8. The microscope objective of claim 7 wherein said adjusting device includes a thread on an intermediate ring coupled with said actuating ring.

9. The microscope objective of claim 8 wherein said adjusting device includes two cams connected respectively to mounts for said second and fourth lenses and engaged respectively in grooves of constant but different pitch in said intermediate ring.

10. The microscope objective of claim 1 wherein movement of said fourth lens to change an air separation distance (d10) from said stationary third lens changes a field correction of said microscope objective for astigmatism.

11. The microscope objective of claim 1 wherein both of said first and third lenses are positive single lenses.

12. The microscope objective of claim 1 wherein said movable second lens has a positive refractive power.

13. The microscope objective of claim 1 wherein said movable fourth lens is a cemented component of negative refractive power.

14. The microscope objective of claim 1 in a planachromatic form containing eight lenses in four groups, arranged so that:
   said first lens (L1) is in the form of a concave-convex converging lens;
   said second lens includes a concave-convex single lens (L2) at a distance (d2) from said first lens (L1) and a cemented component (L3) consisting of three lenses, the middle lens of which is a bi-convex converging lens opposed by a convex-concave dispersing lens and a concave-convex dispersing lens;
   said third lens (L4) is a bi-convex single lens at a distance (d8) from said cemented component (L3);
   said fourth lens (L5) is a cemented component consisting of a bi-convex converging lens and a bi-concave dispersing lens at a distance (d10) from said third lens (L4);
   and said distances (d2, d8, and d10) are variable for said adjustment to said different cover-glass thicknesses.

15. The microscope objective of claim 14 wherein said lenses are structured according to the following table for lens radii r, lens thicknesses and distances d, indexes of refraction nd, and Abbe numbers γd of the values of said lenses, to produce the indicated linear magnification and numerical aperture and accommodate cover-glass thicknesses from zero to 2 millimeters, as follows:

TABLE I

| Lens | Radius r/mm | Thickness d/mm | Distance d/mm | Index of Refraction nd | Abbe Number γd |
|---|---|---|---|---|---|
| L1 | r1 = −3.566 | d1 = 3.24 | | 1.5205 | 69.7 |
| | r2 = −3.839 | | d2 = 1.43 to 0.48 | | |
| L2 | r3 = −659.4 | d3 = 2.50 | | 1.5891 | 61.3 |
| | r4 = −10.96 | | d4 = 0.62 | | |
| | r5 = 48.448 | d5 = 1.0 | | 1.6134 | 44.3 |
| L3 | r6 = 7.515 | d6 = 4.7 | | 1.4866 | 84.5 |
| | r7 = −8.485 | d7 = 1.0 | | 1.8807 | 41.0 |
| | r8 = −24.36 | | d8 = 0.20 to 1.15 | | |
| L4 | r9 = 17.013 | d9 = 3.0 | | 1.5285 | 77.0 |
| | r10 = −25.925 | | d10 = 15.75 to 19.06 | | |
| | r11 = 8.593 | d11 = 4.0 | | 1.4585 | 67.7 |
| L5 | r12 = −29.03 | d12 = 1.5 | | 1.6967 | 56.4 |
| | r13 = 5.975 | | | | |

Cover-glass: 0 to 2 mm
Working distance: W = 3.3 mm to 2.2 mm
Linear magnification: β = 40 x
Numerical aperture: A = 0.6.

16. The microscope objective of claim 14 wherein said lenses are structured according to the following table for lens radii r, lens thicknesses and distances d, indexes of refraction nd, and Abbe numbers γd of the values of said lenses, to produce the indicated linear magnification and numerical aperture and accommodate cover-glass thicknesses from zero to 2 millimeters, as follows:

17. The microscope objective of claim 14 wherein said lenses are structured according to the following table for lens radii r, lens thicknesses and distances d, indexes of refraction nd, and Abbe numbers γd of the values of said lenses, to produce the indicated linear magnification and numerical aperture and accommodate cover-glass thicknesses from zero to 2 millimeters, as follows:

TABLE II

| Lens | Radius r/mm | Thickness d/mm | Distance d/mm | Index of Refraction nd | Abbe Number γd |
|---|---|---|---|---|---|
| L1 | r1 = −2.751 | d1 = 2.05 | | 1.5205 | 69.7 |
| | r2 = −3.110 | | d2 = 1.44 to 0.21 | | |
| L2 | r3 = −132.1 | d3 = 2.15 | | 1.4866 | 84.5 |
| | r4 = −7.032 | | d4 = 3.38 | | |
| | r5 = 34.383 | d5 = 2.0 | | 1.5986 | 46.9 |
| L3 | r6 = 9.040 | d6 = 5.0 | | 1.4866 | 84.5 |
| | r7 = −7.766 | d7 = 1.0 | | 1.8807 | 41.0 |
| | r8 = −17.974 | | d8 = 3.73 to 4.96 | | |
| L4 | r9 = 15.281 | d9 = 3.0 | | 1.4866 | 84.5 |
| | r10 = −163.8 | | d10 = 10.48 to 16.07 | | |
| | r11 = 5.862 | d11 = 3.9 | | 1.4875 | 70.4 |
| L5 | r12 = −21.964 | d12 = 1.0 | | 1.6228 | 56.9 |
| | r13 = 4.278 | | | | |

Cover-glass: 0 to 2 mm
Working distance: W = 2.4 mm to 1.55 mm
Linear magnification: β = 32 x
Numerical aperture: A = 0.55.

TABLE III

| Lens | Radius r/mm | Thickness d/mm | Distance d/mm | Index of Refraction nd | Abbe Number $\gamma$ d |
|---|---|---|---|---|---|
| L1 | r1 = −3.563 | d1 = 2.21 | | 1.5205 | 69.7 |
| | r2 = −3.091 | | d2 = 1.40 to 0.11 | | |
| L2 | r3 = −354.6 | d3 = 2.22 | | 1.4866 | 84.5 |
| | r4 = −8.262 | | d4 = 0.9 | | |
| | r5 = 39.776 | d5 = 0.9 | | 1.6134 | 44.3 |
| L3 | r6 = 8.778 | d6 = 4.63 | | 1.4866 | 84.5 |
| | r7 = −6.945 | d7 = 1.02 | | 1.8807 | 41.0 |
| | r8 = −17.314 | | d8 = 0.19 to 1.48 | | |
| L4 | r9 = 13.598 | d9 = 3.4 | | 1.4866 | 84.5 |
| | r10 = −54.136 | | d10 = 13.85 to 20.30 | | |
| | r11 = 5.143 | d11 = 3.87 | | 1.4585 | 67.7 |
| L5 | r12 = −10.086 | d12 = 1.24 | | 1.6511 | 55.6 |
| | r13 = 3.927 | | | | |

Cover-glass: 0 to 2 mm
Working distance: W = 2.35 mm to 1.3 mm
Linear magnification: $\beta$ = 50 x
Numerical aperture: A = 0.65.

* * * * *